Figure 1:
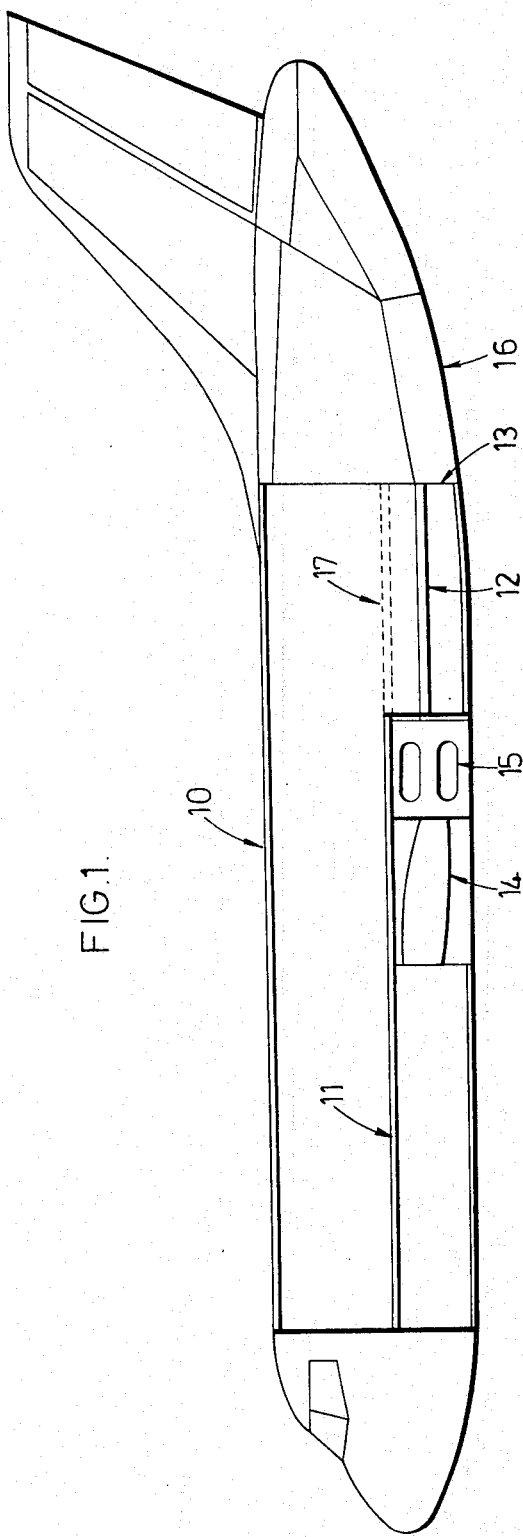

United States Patent [19] [11] 3,920,205
Bell [45] Nov. 18, 1975

[54] AIRCRAFT
[75] Inventor: Alan Brentford Bell, Bury, England
[73] Assignee: Hawker Siddeley Aviation Limited, England
[22] Filed: Apr. 5, 1974
[21] Appl. No.: 458,309

[30] Foreign Application Priority Data
Apr. 5, 1973 United Kingdom............... 16417/73

[52] U.S. Cl. .......................... 244/118 R; 214/75 T
[51] Int. Cl.² ......................................... B64C 1/20
[58] Field of Search......... 244/118 R, 118 P, 137 R; 214/85, 50 S, 75 T, 75 R; 187/25, 24; 196/1 A

[56] References Cited
UNITED STATES PATENTS
| 2,323,279 | 6/1943 | VanZelm | 244/118 R |
| 2,402,283 | 6/1946 | Hewitt | 296/1 A |
| 2,846,092 | 8/1958 | Garnett | 214/85 |
| 3,002,719 | 10/1961 | Weiland et al. | 244/118 R |
| 3,104,127 | 9/1963 | Swartzwelder | 296/1 A |
| 3,568,804 | 3/1971 | Olsen | 187/25 |

Primary Examiner—Trygve M. Blix
Assistant Examiner—Galen L. Barefoot
Attorney, Agent, or Firm—Rose & Edell

[57] ABSTRACT

For conversion of an aircraft from a passenger-carrying to a freight load/vehicle carrying role, in which latter it is suitable for air-dropping of loads, it is provided internally with a stepped floor consisting of a fixed forward section at a higher level and a rear section at a lower level extending aft from the step between levels to the threshold of a rear cargo door, the rear section being capable of being raised and lowered. The rear section is selectively operable so that it can either be raised to the level of the forward section at its front end only, to provide an inclined ramp for roll-on roll-off loading of the front section, or it can be raised and lowered between the two levels while remaining horizontal to serve as a cargo/vehicle lift.

6 Claims, 11 Drawing Figures

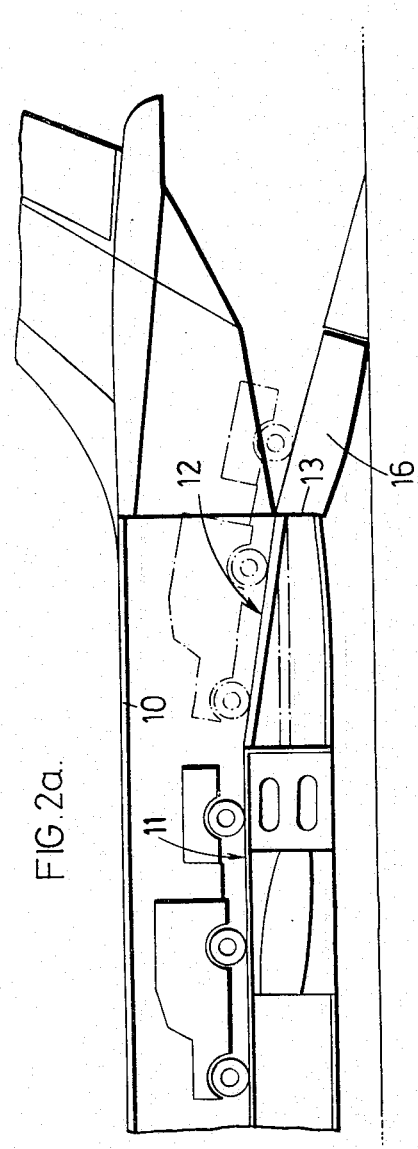
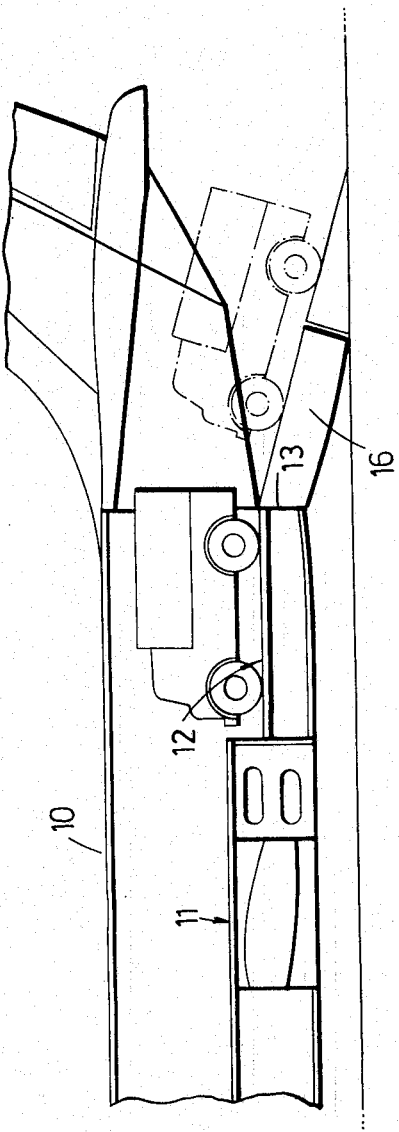

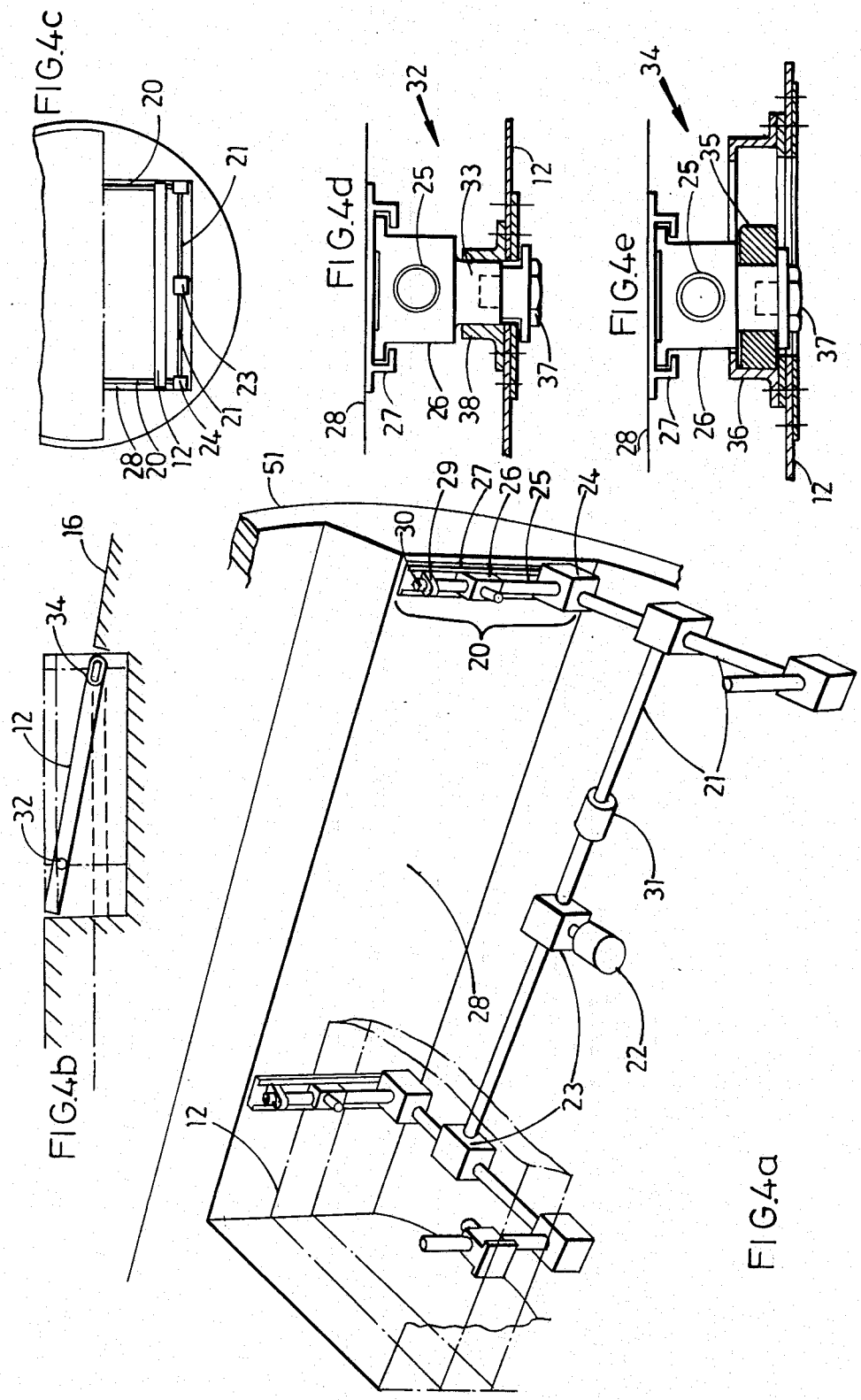

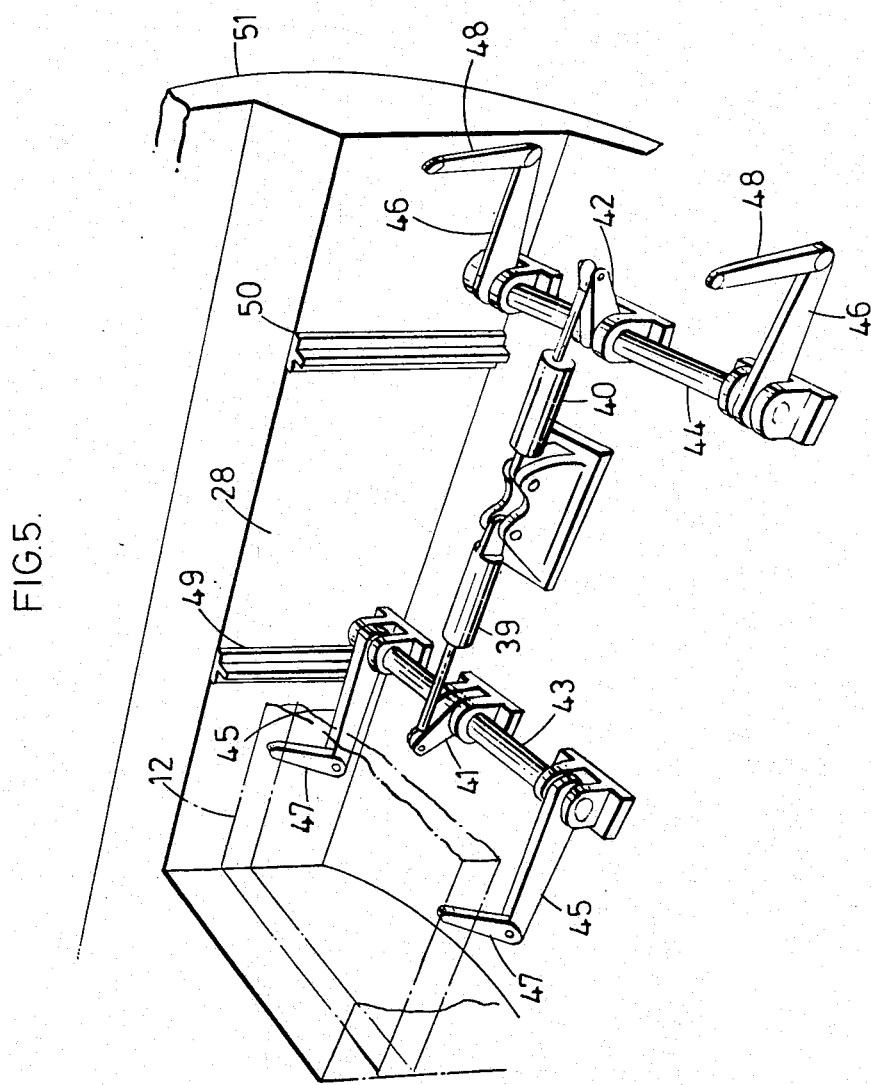

AIRCRAFT

This invention relates to aircraft and more particularly to adapting passenger-carrying aircraft for freight or vehicle transport.

There is a requirement that aircraft designed for commercial passenger carrying should have the facility for conversion to a freight or vehicle carrying role either in the commercial or military fields. In the latter case, in particular, such an aircraft may serve a dual role carrying troops or equipment, with a further conversion to an aerial dropping facility.

When undertaking the conversion of a civil transport for military use it is usually necessary to lower the floor level, within the fuselage, to provide the greater headroom required for the carriage of larger items of military equipment. It may not always be possible to lower the floor over its complete length due to limitations imposed by the wing torsion box, main undercarriage, equipment and storage bays, etc. In such a case it may be desirable to provide a 'stepped' floor where part of the floor remains at its original level and the remaining part is lowered to provide the additional headroom required.

A stepped floor produces difficulties in loading, and in air dropping, that equipment which is able to be carried on the higher floor level. These difficulties can be alleviated by providing a hinged floor section which can be swung upwards from a position substantially in alignment with the loading door threshold, thereby giving a loading incline to the higher level. On completion of that part of the loading cycle, the hinged floor section can be lowered to the horizontal attitude ready to accommodate the larger items of equipment. However, in the 'air dropping' role this technique is unsatisfactory as only those items stored on the lower level would be ejectable, the use of the incline being unacceptable for reasons inter alia of control of loads being dropped as they move down the inclined floor and the interference caused by the intersection of the incline and the substantially horizontal forward floor and loading door threshold.

The problem can be partially overcome by adopting a vertically lifting platform, instead of a hinged floor section. This also has its limitations because, although it does allow a complete fuselage freight load to be 'air dropped,' the initial loading operation is tedious and time-consuming. It is an object of the present invention to achieve a better solution to the foregoing problems.

According to the invention the lower floor level comprises a floor section or platform that is both inclinable and vertically lifting. For air dropping the loads in the front compartment, the whole platform is raised to the level of the forward floor and the forward load is moved rearward on to the elevated platform which is then lowered to the air drop position at the level of the door threshold.

Figure 3A:
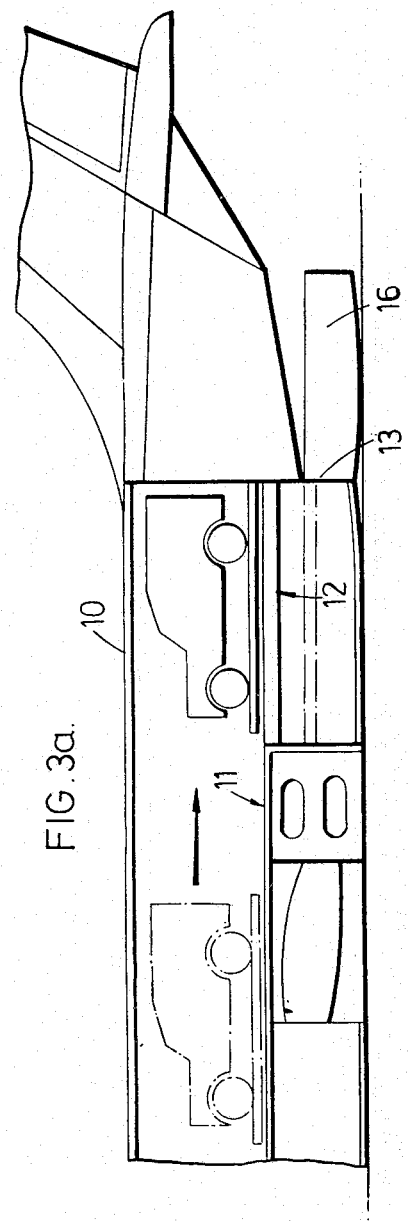
Figure 3B:
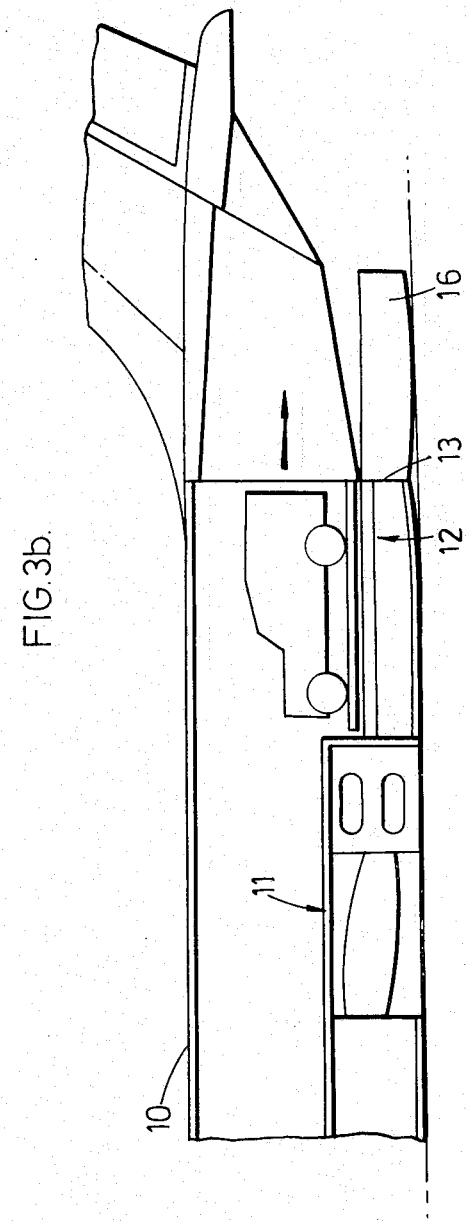

Arrangements according to the invention will now be described by way of example and with reference to the accompanying drawings, in which:

FIG. 1 is a diagrammatic side elevation of an aircraft according to the invention, FIGS. 2a and 2b illustrate loading/unloading the aircraft on the ground, FIGS. 3a and 3b illustrate air-dropping of loads, FIG. 4a shows, in diagrammatic pictorial view, a four-screw jack system for raising and lowering the vertically lifting floor platform, FIG. 4b is a diagrammatic side elevation to illustrate the attachment points of the jacks to the platform, FIG. 4c is a diagrammatic end elevation of the system of FIG. 4a, FIGS. 4d and 4e are plan views, partly in section, of the platform attachment arrangements for the front and rear jacks, respectively, and FIG. 5 is a diagrammatic pictorial view of an alternative system for raising and lowering the platform, employing levers and hydraulic jacks.

Referring now to the accompanying drawings, FIG. 1 shows the general floor configuration of an aircraft 10, comprising a forward section 11, at normal passenger carrying level, and a lower rear section 12 extended back to a door threshold 13. The position of the change in floor level is dictated by the wing torsion box 14 and the undercarriage bay 15.

The door 16 is an undersection of the rear fuselage hinged at the threshold 13 so that it can drop down to form a loading ramp.

FIG. 2a shows the operation of loading/unloading of the forward floor 11 with the rear floor platform 12 in the inclined position. FIG. 2b shows loading/unloading of the rear floor platform 12 when in its lowered position. FIGS. 3a and 3b illustrate air dropping of a load from the forward floor 11, with the rear platform 12 being kept horizontal and used as a lift.

There is a further significant advantage in this arrangement, in that in the conventional passenger transport role (or in a troop transport role) the platform 12 can be fixed in the raised position as indicated at 17 in FIG. 1. The platform will be provided with seat rails, or other suitable seat securing fittings, which can also be used for the attachment of roller mat equipment as required for movement of the loads in the "air dropping" and freight carrying roles.

There are many variations within the scope of this invention, which has application to dual purpose commercial freight aircraft as well as to the military conversion case.

FIGS. 4a to 4e and 5 illustrate two methods of varying the inclination and height of the platform 12. FIGS 4a to 4e show a system of four screw jacks 20 near corners of the platform coupled by shafting 21 driven by a motor 22. Each screw jack 20 consists of a bevel gear box 24, a screw 25 and a nut 26 held and guided in a guide track 27. The nuts 26 of the four jacks 20 are engaged with the platform 12 by having trunnion pins 33 received in two forward platform bearing sockets 32 and two rear bearing sockets 34. To ensure the loads applied to the screw 25 of each jack are mainly in tension, it is solidly supported at the top end by a bracket 29 which incorporates a thrust bearing 30, while the bevel gear box 24 at the bottom end is flexibly mounted. The guides 27 are fastened to the fuselage side wall structure 28 to transmit the loads into the fuselage 51.

To raise or lower the platform 12, the motor 22 drives the four screw jacks through the shafting 21 and gear boxes 23. The drive input to the bevel gear box 24 of each shaft rotates the screw 25 and the nut 26, which slides in the guide 27 and cannot rotate, is forced to raise or lower the platform 12 to which it is attached. For raising or lowering the platform 12 while maintaining it horizontal, the four screw jacks 20 operate in unison.

For inclining the platform 12, the two rear screw jacks 20 are rendered inoperative by disengaging a clutch unit 31. The two forward attachments 32 allow the platform 12 to pivot about the trunnions 33 when it is inclined, and the two rear attachments 34 each incorporate a shoe 35 and a slide 36 to permit limited fore and aft movement of the rear end of the platform to take place at this point.

Side load is transmitted to the fuselage structure from one side of the platform only. This is accomplished by means of side load studs 37 screwed into the trunnion pins 33 of the port forward attachment 32 and the port rear attachment 34. Fore and aft load is transmitted through the trunnion bearing sockets 38 at the two forward attachments 32.

FIG. 5 illustrates an alternative system, utilising cranks operated by hydraulic jacks 39, 40 fitted below the platform 12.

When the platform 12 is required to be raised vertically in a horizontal attitude, both hydraulic jacks 39 and 40 are actuated. The movement that is consequently imparted to cranks 41 and 42 by the retraction of the hydraulic jacks 39 and 40 is transmitted by transverse shafts 43 and 44 to further cranks 45 and 46. This causes equal upward forces to be applied to regions near the four corners of the platform 12 by pivotal links 47 and 48 connected to the cranks 45 and 46.

Vertical guide rails 49 are attached to the aircraft side walls 28 on each side of the platform 12 at its forward end. The guide rails 49 provide restraint both in the fore and aft and in the sideways directions by means of engagement of the guides by suitable co-operating restraint fittings on the floor panel 12, so that the platform loads are transferred into the fuselage structure 51.

Further guide rails 50, likewise secured to the side walls 20, are provided toward the rear of the platform. These rear guide rails 50 cooperate with fittings on the platform that are designed to provide sideways restraint only and to transmit the side loads into the fuselage structure 51. Freedom for limited fore and aft movement is provided at the rear guide rails, to allow the rear end of the platform to make such movement when the platform is inclined.

To incline the platform 12, only the forward hydraulic jack 39 is actuated and the platform 12 is allowed to pivot around its mounting on the rear links 48.

When the platform 12 is in the lower position the levers 45 and 46 rest in contact with stops to off-load the hydraulic jacks 39 and 40 as a safety measure in case of hydraulic failure.

I claim:

1. A transport aircraft comprising a fuselage, a rear-loading cargo door forming an under portion of said fuselage near the after end thereof, said door having a hinge connection at its forward edge to a fixed door threshold portion of the fuselage so as to drop down about said hinge connection to form a loading ramp, a cargo floor inside said fuselage forward of said door, said floor having a fixed higher forward section at a level above the forward edge of said door and a movable rear section extending from the rear end of said forward floor section to said door threshold, four lifting members respectively located in the regions of the four corners of said movable rear floor section to raise said rear floor section from a position level with said forward edge of said door to a position level with said forward floor section, and means to actuate said four lifting members which lifting-member-actuating means include: first means selectively operable in one mode to actuate all four lifting members in unison thereby to raise said rear floor section while maintaining it horizontal; and second means selectively operable in another mode to actuate only the forward pair of lifting members independently of the rear pair so as to include said rear floor section.

2. An aircraft according to claim 1, wherein said lifting members are screw jacks having nuts travelling vertically in guides fixed to the fuselage structure, for transmitting lateral and fore and aft forces from the rear floor section to said structure.

3. An aircraft according to claim 2, wherein the screws of the jacks depend from strong mountings at their upper ends incorporating thrust bearings so that the jacks, in supporting the rear floor section, are mainly in tension.

4. An aircraft according to claim 1, wherein the rear floor section is carried by a system of support links or levers supporting it in the regions of its four corners and operable to raise/lower or incline said floor section by means of hydraulic jacks disposed generally horizontally under said floor section.

5. An aircraft according to claim 4, wherein the forward support links and the aft support links are operable independently by two separate jacks, the jacks working in unison to raise/lower said rear floor section while keeping it level, and only the jack for the front links working when said floor section is to be inclined.

6. An aircraft according to claim 1, wherein the rear supports of the rear floor section are arranged to permit limited fore and aft movement of the rear end of said floor section as the floor section is inclined, while the forward supports prevent fore and aft movement of the forward end.

* * * * *